United States Patent Office 3,194,770
Patented July 13, 1965

3,194,770
CURING COMPOSITION COMPRISING AN ORGANO-TIN COMPOUND AND A SILOXANE-OXYALKYLENE COPOLYMER
Fritz Hostettler, Charleston, W. Va., assignor to Union Carbide Corporation, a corporation of New York
No Drawing. Filed Nov. 25, 1958, Ser. No. 776,201
6 Claims. (Cl. 252—431)

This application is a continuation-in-part of copending application Serial No. 686,009, filed September 25, 1957, now abandoned.

This invention relates to novel curing compositions which are particularly adapted for use in the manufacture of foamed reaction products. More particularly, this invention is directed to novel curing compositions comprising an organo-tin compound and a polysiloxane-oxyalkylene copolymer, both hereinafter more fully described.

The production of flexible foamed reaction products from reaction mixtures containing polyisocyanates is a relatively recent development. The reaction mixtures from which foamed products are made contain polymeric materials which are either liquid at room temperature or capable of being melted at relatively low temperature. The polymeric materials contain active hydrogen atoms which react with isocyanate groups to form a network of cross-linked molecular chains. The polyisocyanate not only functions as a cross-linking agent, but also reacts with water provided in the reaction mixture to form carbon dioxide which causes the liquid reaction mixture to expand and foam with the resultant formation of the foamed reaction product which retains its foamed character after the polymer has been cross-linked.

The reaction between the isocyanate and water to form carbon dioxide and the reaction between the polyisocyanate and the polymeric material to effect a cure of the polymeric material takes place concurrently. However, it is difficult to control the individual reaction rates so that ideal conditions exist. Another problem which exists is the stability of the foam once it is produced, assuming the reaction rates of curing and carbon dioxide generation have been adjusted so that ideal conditions exist. Foam stability is principally governed by two factors, namely, viscosity of the active hydrogen component upon reaction with the polyisocyanate and the surface tension of the expanded material. In general, the higher the viscosity and the lower the surface tension the more stable the foam. Of course, the ability of a curing composition to provide a stable foamed product is related to the rate of foamant evolution and the rate of reaction between polyisocyanate and active-hydrogen containing polymeric material.

The present invention is based on the discovery that the curing compositions of the present invention achieve the delicate balance between the rate of cure and the rate of carbon dioxide evolution, on the one hand, and the viscosity and surface tension on the other, necessary to produce a stable foamed reaction product.

The curing compositions of the present invention comprise an organo-tin compound having a direct carbon to tin valence bond and at least one catalytically intensifying bond from said tin to halogen, oxygen, sulfur, nitrogen or a phosphorous atom and a surfactant comprising a polysiloxane-oxyalkylene copolymer.

Among the organic tin compounds characterized as above, which have been tested and shown to be active, are tin compounds having the general formulae set forth below:

(a) $R_3SnX$ (b) $R_2SnX_2$ (c) $RSnX_3$ (d) $R_2SnY$ (e) $RSnOOR'$ (f) $R(SnOOR')_2$ (g) 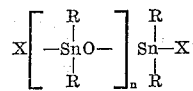

(h) $R_2Sn(YRX)_2$ in which the R's represent hydrocarbon or substituted hydrocarbon radicals, such as alkyl, aralkyl, aryl, alkaryl, alkoxy, cycloalkyl, alkenyl, cycloalkenyl and analogous substituted hydrocarbon radicals, the R's represent hydrocarbon or substituted hydrocarbon radicals, such as those designated by the R's or hydrogen or metal ions, the X's represent hydrogen, halogen, hydroxyl, amino, alkoxy, substituted alkoxy, acyloxy, substituted acyloxy, acyl radicals or organic residues connected to tin through a sulfide link, and the Y's represent chalcogens including oxygen and sulfur.

Among the compounds of group (a) that deserve special mention are trimethyltin hydroxide, tributyltin hydroxide, trimethyltin chloride, trimethyltin bromide, tributyltin chloride, trioctyltin chloride, triphenyltin chloride, tributyltin hydride, triphenyltin hydride, triallyltin chloride, and tributyltin fluoride.

The compounds in group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibuyltin dichloride, dioctyltin dichloride, diphenyltin dichloride, diallyltin dibromide, diallyltin, diiodide, bis(carboethoxymethyl)tin diiodide, dibutyltin dimethoxide, dibutyltin dibutoxide, $(C_4H_9)_2Sn[OCH_2(CH_2OCH_2)_{x-1}CH_2OCH_3]_2$ (in which $x$ is a positive integer), dibutyl-bis[O-acetylacetonyl]-tin, dibutyltin-bis(thiododecoxide), and

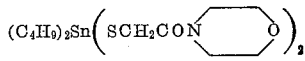

all readily prepared by hydrolysis of the corresponding dihalides. Many commercially available compounds used as stabilizers for vinyl resins are also included in this group.

Among the compounds that are representative of group (c) are butyltin trichloride, octyltin trichloride, butyltin triacetate and octyltin tris(thiobutoxide).

Typical among the compounds of group (d) are dimethyltin oxide, diethyltin oxide, dibutyltin oxide, dioctyltin oxide, dilauryltin oxide, diallyltin oxide, diphenyltin oxide, dibutyltin sulfide, $[HOOC(CH_2)_5]_2SnO$, $[CH_3OCH_2(CH_2OCH_2)_{x-1}CH_2]_2SnO$, and $[CH_3OCH_2(CH_2OCH_2)_{x-1}CH_2O(CH_2)_5]_2SnO$ (in which the $x$'s are positive integers).

Methylstannonic acid, ethylstannonic acid, butylstannonic acid, octylstannonic acid, $HOOC(CH_2)_5\text{—}SnOOH$,

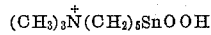

$CH_3OCH_2(CH_2OCH_2)_{x-1}CH_2SnOOH$ and $CH_3OCH_2(CH_2OCH_2)_{x-1}CH_2O(CH_2)_5SnOOH$ are examples of group (e) and group (f) are represented by $HOOSn(CH_2)_xSnOOH$ and $HOOSnCH_2(CH_2OCH_2)_xCH_2SnOOH$, the $x$'s being positive integers.

Typical compounds in group (g) include compounds as poly(dialkyltin oxides), such as dibutyltin basic laurate and dibutyltin basic hexoxide.

Other compounds that are efficient are those of group (h), of which the organo-tin compounds used as heat and light stabilizers for chlorinated polymers and available under the trade names Advastab 17 M (a dibutyltin compound found, upon analysis to contain two sulfur-containing ester groups), Advastab T–50–LT, (a dibutyltin compound found, upon analysis to contain two ester groups) are typical, as well as many other organo-tin compounds available under such trade names as "Advastab," "Nuostabe" and "Thermolite."

The surfactant systems that have met with considerable success when employed in conjunction with the organo-tin compounds described above are those containing siloxane-oxyalkylene copolymers. The siloxane-oxyalkylene copolymers which are effective are the linear (block) copolymers of polymeric alkylene oxides and polymeric dialkylsiloxanes; branched (graft) copolymers of polymeric alkylene oxides and polymeric dialkylsiloxanes and copolymers of a dialkylsiloxane and an alkylene oxide.

The siloxane-oxyalkylene copolymer surfactant component of the curing compositions which have been found to exert such a profound effect are those copolymers which contain from about 10 to about 80 percent by weight of siloxane polymer and from 90 to 20 percent by weight of alkylene oxide polymer.

For the most part, the siloxane-oxyalkylene copolymer surfactant systems comprise predominantly dihydrocarbyl polysiloxane units and oxyalkylene units and may contain one or more, and preferably not more than two or three monohydrocarbyl siloxane units (i.e., not more than two or three bifunctional silicon atoms). Normally, the siloxane units are present in combinations of one or more units forming a chain which comprises the polysiloxane block or blocks of the copolymer.

Thus, one type of block copolymer adapted for use in the surfactant systems as a component in the curing compositions of this invention can be represented by the following general formula:

$$(R')(SiO_3)_x(R_2SiO)_y[(C_nH_{2n}O)_zR'']_a[R''']3_{x-a} \quad (I)$$

where $x$ is an integer and represents the number of trifunctional silicon atoms bonded to a single monovalent or multivalent hydrocarbyl radical, R'; $a$ is an integer and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that the surfactant compositions are mixtures of such block copolymers wherein $y$ and $z$ are of different values and that methods of determining the chain length of the polysiloxane chains and the polyoxyalklene chains give values which represent average chain lengths. In the above formula, R and R'' represent monovalent hydrocarbyl radicals, such as alkyl, aryl or aralkyl radicals, and R'' terminates a polyoxyalkylene chain with a monoether group, R''' is an alkyl radical or a trihydrocarbylsilyl radical and may terminate a siloxane chain, and R' represents a monovalent or polyvalent hydrocarbyl radical, being monovalent when $x$ is 1, divalent when $x$ is 2, trivalent when $x$ is 3, tetravalent when $x$ is 4.

With reference to Formula I above, there is at least one oxyalkylene chain joined to a siloxane chain through a Si—O—C bond, and when $a=1$ and $x=1$, there are two alkyl or trihydrocarbylsilyl groups R''' terminating siloxane chains. However, when $a=3$ and $x=1$, there are no such groups present.

One type of block copolymer is represented when $x$ in Formula I is one, and in this instance, a branched-chain formula may be postulated as follows:

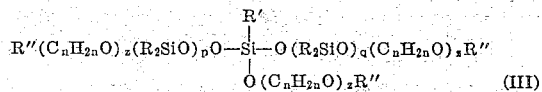

$$\text{(II)}$$

where $p+q+r=y$ of Formula I and has a minimum value of 3, the other subscripts being the same as in Formula I. In this instance, all three of the oxyalkylene chains are joined to the end of polysiloxane chains of the type —$(R_2SiO)$—. A representative composition of the type of compounds or products characterized by Formula II above is a composition wherein the values of $p$, $q$ and $r$ are 6 and the $(C_nH_{2n}O)_z$ unit represents a mixed polyoxyethylene-oxypropylene block containing seventeen (17) oxyethylene units and thirteen (13) oxypropylene units and R'' represents a butyl group. Another composition of the class represented by Formula II above is a composition wherein the values of $p$, $q$ and $r$ are three (3) and the $(C_nH_{2n}O)_z$ unit represents a polyoxyethylene block containing sixteen (16) oxyethylene units and R'' represents a methyl group. Still another composition of the class described is a product wherein the values of $p$, $q$ and $r$ are three (3) and the $(C_nH_{2n}O)_z$ unit is a polyoxypropylene block containing from twelve (12) to thirteen (13) oxypropylene units and R'' represents a butyl group.

However, another type of branched-chain block copolymer exists when one of the oxyalkylene chains is attached through an oxygen atom to the trifunctional silicon atom bonded only to a single hydrocarbyl radical (R'). This formula may be given as follows:

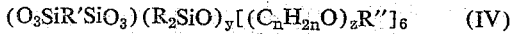

$$\text{(III)}$$

where $p+q=y$ of Formula I and has a minimum value of 3.

Another type of block copolymer is represented when there are present therein two trifunctional silicon atoms each bonded to a single divalent hydrocarbon radical, and correspondingly present therein six (6) polyoxyalkylene chains. Such block copolymers may be represented by the formula:

$$(O_3SiR'SiO_3)(R_2SiO)_y[(C_nH_{2n}O)_zR'']_6 \quad (IV)$$

wherein R, R'', $y$, $n$ and $z$ are as designated for Formula I, and R' is a divalent hydrocarbon radical. Expressed in structural form these block copolymers may be represented by the following formula:

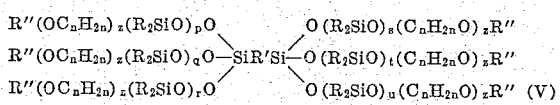

$$\text{(V)}$$

where $p+q+r+s+t+u$ is equal to $y$ of Formula I and in this instance has a minimum value of 6.

The above-described siloxane-oxyalkylene block copolymers can be prepared in accordance with the procedures described and claimed in the copending application of D. L. Bailey and F. M. O'Connor, Serial No. 417,935, filed December 14, 1953; now U.S. Patent No. 2,834,748, issued May 13, 1958.

Other siloxane-oxyalkylene block copolymers which deserve mention are those corresponding to the general formula:

$$R'[(R_2SiO)_y]_a[(C_nH_{2n}O)_xJ_bR'' \quad (VII)$$

where $y$ is an integer having a value of at least 2 and denotes the number of siloxane units, $n$ is an integer from 2 to 4 denoting the number of carbon atoms in the oxyalkylene group, $x$ is an integer having a value of at least 5 and denotes the length of the oxyalkylene chain, and $a$ and $b$ are integers whose sum is 2 or 3. R' and R'' are chain-terminating monovalent hydrocarbyl or hydrocarbyloxy radicals, and may terminate a siloxane chain either by a hydrocarbyloxy group or by completing a trihydrocarbylsilyl group and may terminate an oxyalkylene chain with a hydrocarbyloxy group. It will be understood further that the compositions of matter are mixtures of suck block copolymers wherein $x$ and $y$ are of different values and that methods of determining the chain length of the polysiloxane chains and the polyoxyalkylene chains give values which represent average chain lengths.

With reference to Formula VI above, it will be noted that there is at least one oxyalkylene chain or block joined to at least one siloxane chain or block through a Si—O—C bond, and different types of block copolymers are formed depending on the values of $a$ and $b$.

In one type, there is one block of siloxane polymer ($a$ is 1) and two blocks of oxyalkylene polymer ($b$ is 2) and such type may be represented as follows:

$$R'O(C_nH_{2n}O)_x(R_2SiO)_y(C_nH_{2n}O)_xR'' \qquad (VII)$$

where the subscripts are as defined in Formula VI above and R' and R'' are monovalent hydrocarbyl radicals.

In another type of block copolymer, there is one block of oxyalkylene polymer ($b$ is 1) and two blocks of siloxane polymer ($a$ is 2) and this type may be represented as follows:

$$R'(R_2SiO)_y(C_nH_{2n}O)_x(R_2SiO)_{y-1}R_2SiR'' \qquad (VIII)$$

where R' and R'' are monovalent hydrocarbyl or hydrocarbyloxy radicals, and the other subscripts are as defined in Formula VI.

In a third type of block copolymer, there is one block of a siloxane polymer and one block of an oxyalkylene polymer ($a$ and $b$ both equal 1), and this type may be represented as follows:

$$R'(R_2SiO)_y(C_nH_{2n}O)_xR'' \qquad (IX)$$

where R' and R'' are monovalent hydrocarbyl or hydrocarbyloxy radicals.

The types of siloxane-oxyalkylene block copolymers represented by general Formulae VI through IX can be prepared in accordance with the procedures described and claimed in the copending application of D. L. Bailey and F. M. O'Connor, Serial No. 435,938, filed June 10, 1954, now U.S. Patent No. 2,917,480, issued December 15, 1959.

Still other polysiloxane-oxyalkylene surfactant systems useful as components of the curing compositions of this invention are those containing the aforesaid copolymers characterized by the following general formula:

$$R'O[(C_nH_{2n}O)_y]_c[(R_2SiO)_x(C_nH_{2n}O)_y]_d[(R_2SiO)_x]_eR' \qquad (X)$$

in which R' is hydrogen when attached to oxyalkylene polymers and a monovalent alkyl group when attached to siloxane polymers; R is a monovalent hydrocarbyl group and which can be the same or different for all R's in the molecule; $x$ is an integer of 2 or more; $y$ is an integer of 5 or more; $n$ is an integer from 2 to 4; and $a$ and $b$ are integers each of which is equal to at least one; $c$ and $e$ are integers having a value of zero or one; and $d$ is an integer of a value of one or of a greater value. The symbol, R', as used in this formula, represents a monovalent chain-terminating group which is hydrogen when terminating an oxyalkylene block end of the copolymeric chain. When terminating a silicone block end of the copolymeric chain, R' is an alkyl group. Whether or not the terminal groups are hydrogen or alkyl apparently has little if any influence on the important properties and utility as emulsifiers.

Included within the scope of Formula X are block copolymers wherein the integers $c$ and $e$ are both equal to zero and the integer $d$ is a value of one or more, the general formula of this type being:

$$R''[(R_2SiO)_x(C_nH_{2n}O)]_dH \qquad (XI)$$

wherein R'' designates a monovalent alkyl group, R represents a monovalent hydrocarbyl group; and $x$, $y$, $n$ and $d$ represent integers as defined in Formula X.

Referring to Formula X, a second type of organosilicone block copolymer is one in which $c$ equals one, $e$ equals zero and $d$ has a value of one or more, the general formula of this type being:

$$HO(C_nH_{2n}O)_y[R_2SiO)_x(C_nH_{2n}O)_y]_dH \qquad (XII)$$

wherein R designates a hydrocarbyl group; and $x$, $y$, $n$ and $d$ are integers having the same definitions as for those of like designations in Formula X.

A third type of organo-silicone block copolymer is characterized by siloxane blocks at each end of the copolymeric chain and can be represented by Formula X when $c$ is equal to zero, $e$ has a value of one and $d$ represents an integer of at least one. This type of block copolymer is more particularly illustrated by the general formula:

$$R''O[(R_2SiO)_x(C_nH_{2n}O)_y]_d(R_2SiO)_xR'' \qquad (XIII)$$

wherein R designates a hydrocarbyl group; R'' is an alkyl group; and $x$, $y$, $n$ and $d$ are integers having the same value as provided for in Formula X.

The polysiloxane-oxyalkylene block copolymer emulsifiers characterized by Formulae X through XIII can be prepared according to the procedures described and claimed in the copending application of D. L. Bailey and F. M. O'Connor, Serial No. 661,009, filed May 23, 1957.

Another group of polysiloxane-oxyalkylene block copolymer surfactant systems which deserve mention are mixtures of block copolymers wherein each copolymer contains at least one siloxane polymer and at least one oxyalkylene polymer in combination, the siloxane polymer being comprised of at least one trifunctional silicon atom bonded to three oxygen atoms and a hydrocarbyl group and joined to at least one oxyalkylene polymer through a carbon-oxy-silicon bond and the oxyalkylene polymer being composed of at least 5 oxyalkylene units joined to each other by oxycarbon bonds and joined at least at one end to a siloxane polymer through a carbon-oxysilicon bond.

These compounds can be prepared according to the procedures described and claimed in the copending application of D. L. Bailey and F. M. O'Connor, Serial No. 660,997, filed May 23, 1957.

In addition, it is sometimes desirable to add to the siloxane-oxyalkylene surfactant systems described above, small quantities of hydrocarbyl silicone oils, such as dimethyl silicone oils. It appears that certain beneficial effects can be obtained, such as a more complete regulation of the number and size of the open cells in the foam. Normally, the dimethyl silicone oils employed are those having viscosities from 10 to 1000 centistokes.

The ratios of the components of the curing compositions of the invention are not a critical feature of the invention. It has been observed, however, that when the curing compositions are employed in the manufacture of rigid foamed reaction products, desirably useful products having an optimum of physical properties are obtained when the ratio of organo-tin compound to polysiloxane-oxyalkylene surfactant is maintained in the range of from 4:1 to 1:20 and preferably 2:1 to 1:5 parts by weight. In the manufacture of semi-rigid and flexible foamed reaction products, it is recommended that the ratio of organo-tin compound to polysiloxane-oxyalkylene copolymer be maintained in the range of from about 4:1 to about 1:10 parts by weight.

The curing compositions of the present invention can be advantageously employed to produce stable polyurethane reaction products from reaction mixtures which contain an active-hydrogen containing polymeric material, a polyisocyanate and water.

The active-hydrogen containing polymeric materials include polyesters, polyethers, polyester-ethers and polyester-amides.

Polyethers which can be employed in conjunction with the curing compositions of the invention include linear and branched polyethers having at least one and preferably a plurality of ether linkages and containing at least two hydroxyl groups and being substantially free from functional groups other than hydroxyl. Preferred polyethers are the polyoxyalkylene polyols. Among the polyoxyalkylene polyols which are useful in the practice of this invention are the polyethylene glycols having average molecular weights of 200, 400 and 600 and the polypropylene glycols having average molecular weights of 400, 750, 1200 and 2000. Polymers and copolymers of polyoxyalkylene polyols are also adaptable in the process of this invention as well as the block copolymers of ethylene and propylene oxide. Among the copolymers of polyoxyalkylene polyols, and particularly propylene oxide, that deserve some special mention are the propylene oxide adducts of ethylene glycol, glycerol, 1,2,6-hexanetriol, trimethylolpropane, trimethylolethane, pentaerythritol, sorbitol, tris(hydroxyphenylpropane), triethanolamine, triisopropanolamine, ethylenediamine, diethylenetriamine and ethanolamine, more fully described hereinafter. Linear and branched copolyethers of ethylene oxide and propylene oxide have also been found to be useful in making the foamed products of this invention. Preferred copolymers of propylene oxide and ethylene oxide are those containing 10 per cent ethylene oxide in molecular weights of 500, 2000, 3000 and 4000.

Further useful types of polyethers are block copolymers prepared from propylene oxide and ethylene oxide. These polyethers can be characterized by reference to the following general formula:

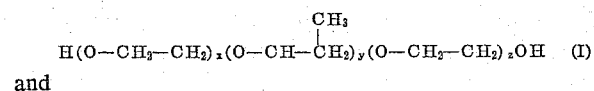

and

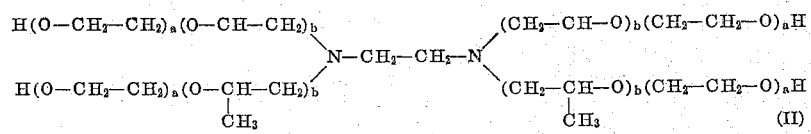

where in Formula I subscripts, $x$, $y$ and $z$, represent positive integers in the range of from 2 to 100 and the subscripts $a$ and $b$ of Formula II represent positive integers in the range of from 1 to 200.

Polyethers having a highly branched chain network are also useful. Such highly branched chain polyethers are readily prepared from alkylene oxides of the type above described and initiators having a functionality greater than two. Highly branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer.

The higher functional initiators that are useful with the alkylene oxides, described above, include polyols, polyamines and amino alcohols having a total of three or more reaction hydrogen atoms on hydroxyl and primary or secondary amino groups. Suitable polyols include triols, such as glycerol, trimethylolpropane, butanetriols, hexanetriols, trimethylolphenol, tris(hydroxyphenyl)propane, tris(hydroxylyl)propane, Novalaks, trialkanolamines, various tetrols, such as erythritol and pentaerythritol; pentols; hexols, such as dipentaerythritol and sorbitol, as well as carbohydrates, polyhydroxy fatty acid esters, such as castor oil and polyoxy alkylated derivatives or polyfunctional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, ethanolamine, diethanolamine, triethanolamine, isopropanolamine, diisopropanolamine, trisisopropanolamine, 2-(2-amino-ethylamino)ethanol, 2 - amine - 2 - (hydroxymethyl)-1,3-propanediol, diethylenetriamine, triethylenetetramine, urea and urea-formaldehyde polymers, as well as various aryl polyamines, such as 4,4',4''-methylidynetrianiline.

Another means of increasing the degree of branching, if desired, when employing linear polyethers, is to include a highly functional initiator, as described above, in the mixture charged to the reaction.

Preferred polyethers of the branched type are those prepared by adding propylene oxide to various diols, triols, tetrols, and polyols as starters to produce adducts of various molecular weights. Polyethers which deserve special mention are the 1,2,6-hexanetriol and glycerol adducts of propylene oxide having molecular weights of 250, 500, 700, 1500, 2500, 3000 and 4000.

The amount of highly functional initiator normally employed with the linear type polyethers described above is an amount in the range of from 0.5 to 6.0 percent by weight of said initiator based on the weight of polyether charged to the reaction.

Generally, the polyethers suitable for employment can be conveniently characterized as normally liquid (although meltable solid polyethers are not excluded), pourable polyethers having viscosities in the range of from 50 centipoises to about 500,000 centipoises at room temperature (250° C.) and having preferably molecular weights in the range of from 200 to about 10,000. When employing polyethers having molecular weights in the range above described, it is readily apparent that foams can be prepared which are tailor-made to the requirements of specific applications. For example, where maximum flexibility of the foamed polymer is a primary requirement, the polyether should, for optimum results, have a molecular weight of approximately 1,500–7,000, if it is a branched type polyether and somewhat less, about 1,000–2,000, if it is a substantially linear type polyether. While it has not been definitely established for semi-rigid foams, the molecular weight of branched polyethers should be in the range of from 700 to about 1,500 and of linear polyethers in the range of from 250–1,000. When it is desired to produce a rigid foam, the molecular weight of the starting polyether should be in the range of from 250–1,000, if the polyether is branched; if linear, the molecular weight of the polyether should be somewhat less, that is, about 200–500.

The polyesters and polyesteramides are formed from polyfunctional materials, such as polycarboxylic acids, aminocarboxylic acids, glycols, aminoalcohols, diamines and the like. The polyesters are readily prepared by reacting at least two bifunctional ingredients; a glycol and a dibasic acid. The polyesteramides are readily prepared by reacting a dibasic acid with a mixture comprising a major amount of a glycol and a minor amount of an amino alcohol or a diamine. Additionally, a wide variety of complex polyesters and polyesteramides can be formed by the reaction of a plurality of acids, glycols, amino alcohol and polyamines.

Representative polyesters and polyesteramides which have utility include polyesters and polyesteramides prepared from ethylene glycol and adipic acid; propylene glycol and adipic acid; ethylene glycol (80 mol percent), propylene glycol (20 mol percent) and adipic acid; ethylene glycol (80 mol percent), propylene glycol 1,2 (20 mol percent) and azelaic acid; ethylene glycol (80 mol percent), propylene glycol 1,2 (20 mol percent) and sebacic acid; ethylene glycol (80 mol percent), propylene glycol 1,2 (20 mol percent) and dilinoleic acid (20 mol percent), adipic acid (80 mol percent); ethylene glycol (80 mol percent), glycerine monoethyl ether (20 mol percent) and adipic acid; ethylene glycol (80 mol percent), butylene glycol 1,4 (20 mol percent) and adipic acid; ethylene glycol (80 mol percent), propylene glycol 1,3 (20 mol percent) and adipic acid; ethylene glycol (80 mol percent), pentanediol 1,5 (20 mol percent) and adipic acid; ethylene glycol (80 mol percent), glycerine monoisopropyl ether (20 mol percent) and adipic acid; ethylene glycol (80 mol percent), propylene glycol 1,2 (from 18 to 5 mol percent), ethanolamine (from 2 to 15 mol percent) and adipic acid; ethylene glycol (80 mol percent), propylene glycol 1,2 (20 mol percent) and maleic acid (from 3 to 6 mol percent), adipic acid (97 to 94 mol percent); ethylene glycol (80 mol percent), propylene glycol 1,2 (from 19 to 17 mol percent), piperazine (from 1 to 3 mol percent) and adipic acid; ethylene glycol (80 mol percent), propylene glycol 1,2 (from 18 to 5 mol percent), dihydroxyethyl aniline (from 2 to 15 mol percent) and adipic acid; ethylene glycol (80 mol percent), butylene glycol 1,4 (20 mol percent) and adipic acid; ethylene glycol (80 mol percent), diethylene glycol (20 mol percent) and adipic acid; ethylene glycol (from 90 to 10 mol percent), propylene glycol 1,2 (from 10 to 90 mol percent) and adipic acid; ethylene glycol (from 90 to 10 mol percent), propylene glycol 1,2 (from 10 to 90 mol percent) and azelaic acid.

The organic polyisocyanates and polyisothiocyanates which can be employed with utility are those of the general formula:

$$R(NCY)_x$$

in which $x$ is two or more and R can be alkylene, substituted alkylene, arylene, substituted arylene, a hydrocarbon or substituted hydrocarbon containing one or more aryl-NCY bonds and one or more alkyl-NCY bonds, a hydrocarbon or substituted hydrocarbon containing a plurality of either aryl-NCY or alkyl-NCY bonds. R can also include radicals, such as —R—Z—R— where Z may be any divalent moiety, such as —O—, O—R—O—, —CO—, —CO$_2$—, —S—, —S—R—S—, —SO$_2$—, etc. Examples of such compounds include hexamethylene, diisocyanate, 1,8-diisocyanato-p-methane, xylylene, diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylylene-alpha,alpha'-diisothiocyanate, and isopropylbenzene-alpha,4-diisocyanate.

Further included are dimers and trimers of isocyanates and diisocyanates and polymeric diisocyanates of the general formulae:

$$(RNCY)_x \text{ and } [R(NCY)_x]_y$$

in which $x$ and $y$ are two or more, as well as compounds of the general formula:

$$M(NCY)_x$$

in which $x$ is one or more and M is a monofunctional or polyfunctional atom or group. Examples of this type include ethylphosphonic diisocyanate, $C_2H_5P(O)(NCO)_2$; phenylphosphonous diisocyanate, $C_6H_5P(NCO)_2$; compounds containing a ≡Si—NCY group, and isocyanates derived from sulfonamides $[R(SO_2NCO)_2]$.

In preparing the curing compositions for use in the manufacture of foamed reaction products, an organo-tin compound or compounds are mixed with the polysiloxane-oxyalkylene copolymer surfactant. The compounds are normally miscible in one another so that they are merely added together, preferably in the amounts recommended supra. Thereafter, the curing compositions can be admixed with an active hydrogen-containing polymeric material of the type previously described and a polyisocyanate or polyisothiocyanate and water. Shortly thereafter the mixture will begin foaming and can be transferred to a mold, if desired.

The following examples will serve to illustrate the practice of the invention and the novel results achieved thereby:

*Example 1*

A recipe was prepared comprising:
(a) 150 grams of polypropylene glycol having a molecular weight of 1900, a hydroxyl number of 58.5, a carboxyl number of 0.15 and 3.0 grams of 1,2,6-hexanetriol,
(b) 60 grams of an 80:20 mixture of 2,4- and 2,6-isomers of tolylene diisocyanate,
(c) 3.75 grams of water,
(d) 0.9 gram of dibutyltin dilaurate.

The above mixture began foaming as soon as the ingredients were mixed. However, the resulting foam collapsed completely during the early stages of the foaming reaction.

This vividly demonstrates that when an essential element of the curing compositions of the present invention is omitted, stable foamed reaction products are not obtained.

*Example 2*

A recipe was prepared comprising:
(a) 100 grams of a triol adduct of propylene oxide started with 1,2,6-hexanetriol and having a molecular weight of about 1500, a hydroxyl number of 113 and a carboxyl number of 0.19,
(b) 42 grams of a 65:35 mixture of 2,4- and 2,6-isomers of tolylene diisocyanate,
(c) 2.5 grams of water,
(d) 1.5 grams of N-methylmorpholine,
(e) 0.5 gram of a copolymer of triethoxy end-blocked branched chain dimethyl polysiloxane having a molecular weight of 1524 and a butoxy end-blocked polyoxyethyleneoxypropylene glycol having a molecular weight of 1500.

The above ingredients were mixed and foaming took place. The resulting foam had very poor cell structure and did not cure sufficiently.

This further illustrates that when the other element of the curing compositions of the invention is omitted, stable foamed reaction products are not obtained.

*Example 3*

A recipe was prepared comprising:
(a) 100 grams of a polypropylene glycol having a molecular weight of 1500,
(b) 42 grams of a 65:35 mixture of 2,4- and 2,6-isomers of tolylene diisocyanate,
(c) 2.5 grams of water,
(d) 0.5 gram of dibutyltin dilaurate,
(e) 1.0 gram of Selectrofoam 6903, a commercial product sold by Pittsburgh Plate Glass Co.

Upon mixing the above ingredients, the mixture began foaming. However, the foam collapsed immediately.

Many other surfactant systems were tested and provided similar results as shown above.

Among the surfactants tested were Bensapol (modified sulfonated castor oil), Cordon 890 (a sulfonated oil), Emulphor EL-719 (a polyoxyethylated vegetable oil), Estol T–Extra (a sulfonated tallow), Hyonic FS (a lauric acid alkylolamide), Igepon TC–42 (sodium N-methyl-N-"coconut oil acid" taurate), Modicol N (a fatty amido condensate), Modicol S (a sulfonated fatty product), Monopole oil (sulfonated castor oil), Nekal NS, Nekal WS–21, Nekal WS–99 (a series of sulfonated aliphatic polyesters), Span 85 (sorbitan trioleate), Tween 20 (a polyoxyethylene sorbitan monolaurate) and Victamine C (a substituted amide of allyl phosphate).

*Example 4*

A recipe was prepared comprising 0.5 gram of dibutyltin dilaurate and 0.5 gram of a copolymer of triethoxy end-blocked branched chain dimethylpolysiloxane having a molecular weight of 858 and a methoxy end-blocked polyoxyethylene glycol having a molecular weight of 750 (as represented by Formula II supra, wherein $p$, $q$ and $r$ each have an average value of three (3), the $(C_nH_{2n}O)_z$ unit is a polyoxyethylene block containing an average of sixteen (16) oxyethylene units and $R''$ represents a methyl group).

The above-described recipe was added to 100 grams of a polyether prepared by the reaction of propylene oxide and 1,2,6-hexanetriol and having a hydroxyl number of 113.0 and a carboxyl number of 0.19 thoroughly mixed with 42 grams of a 65:35 mixture of 2,4- and 2,6-isomers of tolylene diisocyanate and 2.5 grams of water.

The mixture was stirred and transferred to an open mold as soon as it started to foam. The foam was removable from the mold after 15 minutes indicating a highly efficient curing reaction. The foam was characterized by the following physical properties:

Density, lbs./ft.³ _____ 3.28
Tensile strength, lbs./in.² _____ 15.0
Compression load at 25% elongation, p.s.i. _____ 0.89
Compression load at 50% elongation, p.s.i. _____ 1.14
Compression set, percent _____ 10.2

*Example 5*

A recipe was prepared comprising 0.6 gram of dibutyltin dilaurate and 0.5 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The above-described recipe was added to 100 grams of the polyether referred to in Example 4, 42 grams of a 65:35 mixture of 2,4- and 2,6-isomers of tolylene diisocyanate and 2.5 grams of water.

The mixture was transferred to a mold as soon as it started to foam. The resulting foam was characterized by the following physical properties:

Density, lbs./ft.³ _____ 3.26
Tensile strength, lbs./in.² _____ 14.0
Compression load at 25% deflection, p.s.i. _____ 0.73
Compression load at 50% deflection, p.s.i. _____ 0.96
Compression set, percent _____ 9.6

*Example 6*

A recipe was prepared comprising 0.8 gram of dibutyltin diacetate and 0.7 gram of the surfactant composition of Example 5 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The above-described recipe was added to 150 grams of the polyether described in Example 4, 63.5 grams of a 65:35 mixture of 2,4- and 2,6-isomers of tolylene diisocyanate and 3.75 grams of water.

The mixture was transferred to an open mold as soon as it began to foam. The resulting foam was characterized by the following physical properties:

Density, lbs./ft.³ _____ 2.81
Tensile strength, lbs./in.² _____ 12.0
Compression load at 25% deflection, p.s.i. _____ 0.40
Compression load at 50% deflection, p.s.i. _____ 0.57
Compression set, percent _____ 10.6

*Example 7*

A recipe was prepared comprising 0.7 gram of dibutyltin diacetate and 0.75 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The above-described recipe was added to 150 grams of polypropylene glycol having a molecular weight of 1900, a hydroxyl number of 58.5 and a carboxyl number of 0.15 and 3 grams of 1,2,6-hexanetriol; 60 grams of a 65:35 mixture of 2,4- and 2,6-isomers of tolylene diisocyanate; and 3.75 grams of water.

As soon as the mixture began to foam, it was transferred to an open mold and after a period of one hour, the resulting foam could be removed from the mold. The resulting foam was characterized by the following physical properties:

Density, lbs./ft.³ _____ 2.93
Tensile strength, lbs./in.² _____ 17.0
Compression load at 25% deflection, p.s.i. _____ 0.54
Compression load at 50% deflection, p.s.i. _____ 0.73
Compression set, percent _____ 10.3

*Example 8*

A recipe was prepared comprising 0.5 gram of dibutyltin diacetate and 0.5 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The above-described recipe was added to 150 grams of polypropylene glycol having a molecular weight of 1900, a hydroxyl number of 58.5 and a carboxyl number of 0.15 and 3 grams of 1,2,6-hexanetriol; 57 grams of an 80:20 mixture of 2,4- and 2,6-isomers of tolylene diisocyanate; and 3.75 grams of water.

The aforesaid mixture was stirred vigorously until it began to foam. The mixture was then transferred to an open mold and allowed to foam. The resulting foam was characterized by the following physical properties:

Density, lbs./ft.³ _____ 2.17
Tensile strength, lbs./in.² _____ 14.0
Compression load at 25% deflection, p.s.i. _____ 0.32
Compression load at 50% deflection, p.s.i. _____ 0.41
Compression set, percent _____ 20.2

*Example 9*

A recipe was prepared comprising 0.5 gram of dibutyltin diacetate and 1.2 grams of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R" represents a butyl group).

The aforesaid recipe was added to 150 grams of a copolymer of proylene oxide and ethylene oxide containing 10 percent polyethylene oxide and having a molecular weight of 2020, a hydroxyl number of 55.6 and a carboxyl number of 0.09 and 3 grams of 1,2,6-hexanetriol; 55 grams of a 65:35 mixture of 2,4- and 2,6-isomers of tolylene diisocyanate; and 3.75 grams of water.

This mixture was stirred vigorously until it began to foam. The mixture was then transferred to an open mold and allowed to foam. The resulting foam was characterized by the following physical properties:

| | |
|---|---|
| Density, lbs./ft.³ | 3.01 |
| Tensile strength, lbs./in.² | 10.0 |
| Compression load at 25% deflection, p.s.i. | 0.43 |
| Compression load at 50% deflection, p.s.i. | 0.57 |
| Compression set, percent | 19.0 |

*Example 10*

A recipe was prepared comprising 0.69 gram of dibutyltin dilaurate and 0.79 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R" represents a butyl group).

The above-described recipe was added to 150 grams of polypropylene glycol having a molecular weight of 1900, a hydroxyl number of 58.5 and a carboxyl number of 0.15 and 3 grams of 1,2,6-hexanetriol; 58 grams of an 80:20 mixture of 2,4- and 2,6-isomers of tolylene diisocyanate; and 3.75 grams of water.

The mixture was vigorously stirred until it began to foam. As soon as the mixture began foaming, it was transferred to an open mold and allowed to cure. The resulting foam was characterized by the following physical properties:

| | |
|---|---|
| Density, lbs./ft.³ | 2.56 |
| Tensile strength, lbs./in.² | 17.0 |
| Compression load at 25% deflection, p.s.i. | 0.40 |
| Compression load at 50% deflection, p.s.i. | 0.51 |

*Example 11*

A recipe was prepared comprising 0.3 gram of di-2-ethylhexyltin oxide and 0.6 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R" represents a butyl group).

The above-described recipe was added to 150 grams of polypropylene glycol having a molecular weight of 1900, a hydroxyl number of 58.5 and a carboxyl number of 0.185 and 3 grams of 1,2,6-hexanetriol; 58 grams of an 80:20 mixture of 2,4- and 2,6-isomers of tolylene diisocyanate; and 3.75 grams of water.

The aforesaid mixture was stirred vigorously until it began to foam. As soon as the mixture began foaming, it was transferred to an open mold and the resulting foam was characterized by the following physical properties:

| | |
|---|---|
| Density, lbs./ft.³ | 2.72 |
| Tensile strength, lbs./in.² | 16.0 |
| Compression load at 25% deflection, p.s.i. | 0.38 |
| Compression load at 50% deflection, p.s.i. | 0.51 |

*Example 12*

A recipe was prepared comprising 0.8 gram of dibutyltin dilaurate and 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R" represents a butyl group).

The above-described recipe was added to 150 grams of polypropylene glycol having a molecular weight of 1900, a hydroxyl number of 58.5 and a carboxyl number of 0.15 and 3 grams of 1,2,6-hexanetriol; 65 grams of an 80:20 mixture of 2,4- and 2,6-isomers of tolylene diisocyanate; and 3.75 grams of water.

The reactants were stirred until the mixture began to foam, whereupon it was transferred to an open mold and allowed to cure. The resulting foam was characterized by the following physical properties:

| | |
|---|---|
| Density, lb./ft.³ | 2.37 |
| Tensile strength, lbs./in.² | 17.0 |
| Compression load at 25% deflection, p.s.i. | 0.57 |
| Compression load at 50% deflection, p.s.i. | 0.76 |

*Example 13*

A recipe was prepared comprising 0.4 gram of di-n-butyltin diacetate and 0.5 gram of a coplymer comprising the condensation product of a triethoxy end-block branched chain dimethylpolysiloxane having one ethoxy group per terminal silicon atom and having a molecular weight of 1524 and polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R" represents a butyl group).

The aforesaid recipe was added to 100 grams of a triol adduct of propylene oxide started with 1,2,6-hexanetriol having a molecular weight of about 1500, a hydroxyl number of 113, a carboxyl number of 0.19 and 0.083 percent water; 42 grams of an 80:20 mixture of 2,4- and 2,6-isomers of tolylene diisocyanate; and 2.5 grams of water.

The above-described mixture was thoroughly mixed and transferred to an open mold as soon as it started foaming. The foamed mixture cured in a matter of minutes and was characterized by the following physical properties:

| | |
|---|---|
| Density, lbs./ft.³ | 2.95. |
| Tensile strength, lbs./in.² | 13.0. |
| Compression set, percent | 9.25. |
| Compression load, lbs./in.², 25%; 50% | 0.542; 0.733. |

*Example 14*

A recipe was prepared comprising 0.6 gram of dioctyltin oxide and 1.2 grams of a copolymer comprising the condensation product of a triethoxy and end-blocked branched chain dimethylpolysiloxane having one ethoxy group per terminal silicon atom having a molecular weight of 1524 and a butoxy end-block polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 150 grams of a triol adduct of propylene oxide started with 1,2,6-hexanetriol having a molecular weight of about 1500, a hydroxyl number of 113, a carboxyl number of 0.19 and 0.083 percent water; 63 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.70.
Tensile strength, lbs./in.² _____ 13.0.
Compression set, percent _____ 2.65.
Compression load, lbs./in.², 25%; 50% __ 0.414; 0.529.

*Example 15*

A recipe was prepared comprising 0.9 gram of dibutyltin dilaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 150 grams of the triol adduct of propylene oxide started with glycerol having a molecular weight of 2300, a hydroxyl number of 72.0 and a carboxyl number of 0.18; 53 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.71.
Tensile strength, lbs./in.² _____ 11.0.
Compression set, percent _____ 19.6.
Compression load, lbs./in.², 25%; 50% __ 0.414; 0.545.

*Example 16*

A recipe was prepared comprising 0.8 gram of dibutyltin monolaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxyproplylene block containing an average of seventeen (17) oxyethylene units and an average of thirteen (13) oxypropylene units and R″ represents a butyl group).

The aforesaid recipe was added to 150 grams of the triol adduct of propylene oxide started with glycerol having a molecular weight of 2300, a hydroxyl number of 72.0 and a carboxyl number of 0.18; 61 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.37.
Tensile strength, lbs./in.² _____ 11.0.
Compression set, percent _____ 9.52.
Compression load, lbs./in.², 25%; 50% __ 0.459; 0.590.

*Example 17*

A recipe was prepared comprising 0.8 gram of dibutyltin dilaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 150 grams of the triol adduct of propylene oxide started with glycerol having a molecular weight of 2300, a hydroxyl number of 72.0 and a carboxyl number of 0.18; 62 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.51.
Tensile strength, lbs./in.² _____ 13.0.
Compression set, percent _____ 9.5.
Compression load, lbs./in.², 25%; 50% __ 0.520; 0.679.

*Example 18*

A recipe was prepared comprising 0.6 gram of dibutyltin dilaurate and 0.7 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 150 grams of polypropylene glycol having a molecular weight of 1900, a hydroxyl number of 58.5, a carboxyl number of 0.15 and containing 0.13 percent water and 3 grams of 1,2,6-hexanetriol; 58 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 15.0.
Tensile strength, lbs./in.² _____ 2.36.
Compression set, percent _____ 19.6.
Compression load, lbs./in.², 25%; 50% __ 0.334; 0.430.

17

Example 19

A recipe was prepared comprising 0.6 gram of dibutyltin dilaurate and 0.7 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 150 grams of polypropylene glycol having a molecular weight of 1900, a hydroxyl number of 58.5, a carboxyl number of 0.15 and containing 0.13 percent water and 3 grams of 1,2,6-hexanetriol; 58 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.56.
Tensile strength, lbs./in.² _____ 17.0.
Compression set, percent _____ 9.85.
Compression load, lbs./in.², 25%; 50% ___ 0.398; 0.513.

Example 20

A recipe was prepared comprising 0.9 gram of dibutyltin dilaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average vaue of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 100 grams of polypropylene glycol having a molecular weight of 1900, a hydroxyl number of 58.5, a carboxyl number of 0.15 and containing 0.13 percent water and 50 grams of the triol adduct of propylene oxide started with glycerol having a molecular weight of 2300, a hydroxyl number of 72.0 and a carboxyl number of 0.18; 59 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.54.
Tensile strength, lbs./in.² _____ 19.0.
Compression set, percent _____ 11.6.
Compression load, lbs./in.², 25%; 50% ___ 0.459; 0.640.

Example 21

A receipe was prepared comprising 0.9 gram of dibutyltin dilaurate and 0.9 gram of a copolymer containing the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represnted by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid receipe was added to 112.5 grams of polypropylene glycol having a molecular weight of 1900, a hydroxyl number of 58.5, a carboxyl number of 0.15 and containing 0.13 percent water and 50 grams of the triol adduct of propylene oxide started with glycerol having a molecular weight of 2300, hydroxyl number of 72.0 and a carboxyl number of 0.18; 51 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.88.
Tensile strength, lbs./in.² _____ 20.0.
Compression set, percent _____ 8.89.
Compression load, lbs./in.², 25%; 50% __ 0.542; 0.707.

Example 22

A recipe was prepared comprising 0.9 gram of dibutyltin dilaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 100 grams of polypropylene glycol having a molecular weight of 1900, a hydroxyl number of 58.5, a carboxyl number of 0.15 and containing 0.13 percent water and 50 grams of the triol adduct of propylene oxide started with glycerol having a molecular weight of 2300, a hydroxyl number of 72.0 and a carboxyl number of 0.18; 58 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.69.
Tensile strength, lbs./in.² _____ 13.0.
Compression set, percent _____ 7.78.
Compression load, lbs./in.², 25%; 50% __ 0.682; 0.860.

Example 23

A recipe was prepared comprising 0.7 gram of dibutyltin dilaurate and 0.8 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$, have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 75 grams of polypropylene glycol having a molecular weight of 1900, a hydroxyl number of 58.5, a carboxyl number of 0.15 and containing 0.13 percent water and 75 grams of the triol adduct of propylene oxide started with glycerol having a molecular weight of 2300, a hydroxyl number of 72.0 and a carboxyl number of 0.18; 58 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.$^3$ _____ 2.49.
Tensile strength, lbs./in.$^2$ _____ 18.0.
Compression set, percent _____ 7.81.
Compression load, lbs./in.$^2$, 25%; 50% __ 0.615; 0.732.

Example 24

A recipe was prepared comprising 0.4 gram of dioctyltin oxide and 0.8 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The aforesaid recipe was added to 75 grams of polypropylene glycol having a molecular weight of 1900, a hydroxyl number of 58.5, a carboxyl number of 0.15 and containing 0.13 percent water and 75 grams of the triol adduct of propylene oxide started with glycerol having a molecular weight of 2300, a hydroxyl number of 72.0 and a carboxyl number of 0.18; 58 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.$^3$ _____ 2.72.
Tensile strength, lbs./in.$^2$ _____ 17.0.
Compression set, percent _____ 6.02.
Compression load, lbs./in.$^2$, 25%; 50% __ 0.605; 0.780.

Example 25

A recipe was prepared comprising 1.0 gram of dibutyltin dilaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The aforesaid recipe was added to 112.5 grams of polypropylene glycol having a molecular weight of 1900, a hydroxyl number of 58.5, a carboxyl number of 0.15 and containing 0.13 percent water and 37.5 grams of the triol adduct of propylene oxide started with 1,2,6-hexanetriol having a molecular weight of 3800, a hydroxyl number of 44.2, a carboxyl number of 0.05 and 0.10 percent water; 57 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.$^3$ _____ 3.30.
Tensile strength, lbs./in.$^2$ _____ 27.0.
Compression set, percent _____ 7.1.
Compression load, lbs./in.$^2$, 25%; 50% __ 0.987; 1.26.

Example 26

A recipe was prepared comprising 1.0 gram of dibutyltin dilaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The aforesaid recipe was added to 100 grams of polypropylene glycol having a molecular weight of 1900, a hydroxyl number of 58.5, a carboxyl number of 0.15 and containing 0.13 percent water and 50 grams of the triol adduct of propylene oxide started with 1,2,6-hexanetriol having a molecular weight of 3800, a hydroxyl number of 44.2, a carboxyl number of 0.05 and 0.10 percent; 56.0 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.$^3$ _____ 2.76.
Tensile strength, lbs./in.$^2$ _____ 20.0.
Compression set, percent _____ 7.72.
Compression load, lbs./in.$^2$, 25%; 50% __ 0.765; 0.981.

Example 27

A recipe was prepared comprising 0.6 gram of dibutyltin dilaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The aforesaid recipe was added to 112.5 grams of polypropylene glycol having a molecular weight of 1900, a hydroxyl number of 58.5, a carboxyl number of 0.15 and containing 0.13 percent water and 37.5 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash, percent | .25 |
| Average molecular weight | 3,629 |
| Hydroxyl number | 61.8 |
| Acid number | Nil |
| Gel test, seconds | 6 |
| pH 10:1 aqueous isopropanol | 9.10 |
| pH 10:6 aqueous isopropanol | 9.55 |
| Color, Gardner | 3.5 |
| Unsaturation, meg./gm. | .015 |

50.5 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

| | |
|---|---|
| Density, lbs./ft.$^3$ | 2.57 |
| Tensile strength, lbs./in.$^2$ | 13.0 |
| Compression set, percent | 11.2 |
| Compression load, lbs./in.$^2$, 25%; 50% | 0.354; 0.465 |

*Example 28*

A recipe was prepared comprising 0.7 gram of dibutyltin dilaurate and 1.0 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The aforesaid recipe was added to 100 grams of polypropylene glycol having a molecular weight of 1900, a hydroxyl number of 58.5, a carboxyl number of 0.15 and containing 0.13 percent water and 50 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash, percent | .25 |
| Average molecular weight | 3,629 |
| Hydroxyl number | 61.8 |
| Acid number | Nil |
| Gel test, seconds | 6 |
| pH 10:1 aqueous isopropanol | 9.10 |
| pH 10:6 aqueous isopropanol | 9.55 |
| Color, Gardner | 3.5 |
| Unsaturation, meg./gm. | .015 |

50.5 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

| | |
|---|---|
| Density, lbs./ft.$^3$ | 2.74 |
| Tensile strength, lbs./in.$^2$ | 12.0 |
| Compression set, percent | 12.0 |
| Compression load, lbs./in.$^2$, 25%; 50% | 0.465; 0.615 |

*Example 29*

A recipe was prepared comprising 0.6 gram of dibutyltin dilaurate and 0.9 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The aforesaid recipe was added to 100 grams of polypropylene glycol having a molecular weight of 1900, a hydroxyl number of 58.5, a carboxyl number of 0.15 and containing 0.13 percent water and 50 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash, percent | .25 |
| Average molecular weight | 3,629 |
| Hydroxyl number | 61.8 |
| Acid number | Nil |
| Gel test, seconds | 6 |
| pH 10:1 aqueous isopropanol | 9.10 |
| pH 10:6 aqueous isopropanol | 9.55 |
| Color, Gardner | 3.5 |
| Unsaturation, meg./gm. | .015 |

58 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

| | |
|---|---|
| Density, lbs./ft.$^3$ | 2.32. |
| Tensile strength, lbs./in.$^2$ | 10.0. |
| Compression set, percent | 10.0. |
| Compression load, lbs./in.$^2$, 25%; 50% | 0.459; 0.583. |

*Example 30*

A recipe was prepared comprising 0.8 gram of dibutyltin dilaurate and 0.8 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and $R''$ represents a butyl group).

The aforesaid recipe was added to 100 grams of polypropylene glycol having a molecular weight of 1900, a hydroxyl number of 58.5, a carboxyl number of 0.15 and containing 0.13 percent water and 15 grams of a triol adduct of propylene oxide started with 1,2,6-hexanetriol having a molecular weight of about 1500, a hydroxyl number of 113, a carboxyl number of 0.19, and 0.083 percent water; 64 grams of an 80:20 mixture of 2,4- and 2,6-isomers of tolylene diisocyanate; and 3.75 grams of water.

The above-described mixture was thoroughly mixed and transferred to an open mold as soon as it started foaming.

The foamed mixture cured in a matter of minutes and was characterized by the following physical properties:

Density, lbs./ft.³ _____ 2.30.
Tensile strength, lbs./in.² _____ 10.0.
Compression set, percent _____ 12.4.
Compression load, lbs./in.², 25%; 50% __ 0.309; 0.420.

*Example 31*

A recipe was prepared comprising 0.8 gram of dibutyltin dilaurate and 0.8 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 110 grams of polypropylene glycol having a molecular weight of 1900, a hydroxyl number of 58.5, a carboxyl number of 0.15 and containing 0.13 percent water and 40 grams of a triol adduct of propylene oxide started with 1,2,6-hexanetriol having a molecular weight of 700, a carboxyl number of 0.03, a hydroxyl number of 243.0 and containing 0.09 percent water; 62.0 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.54.
Tensile strength, lb./in.² _____ 13.0.
Compression set, percent _____ 19.4.
Compression load, lbs./in.², 25%; 50% __ 0.350; 0.471.

*Example 32*

A recipe was prepared comprising 0.4 gram of dibutyltin dilaurate and 0.5 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 75 grams of polyproylene glycol having a molecular weight of 1900, a hydroxyl number of 58.5, a carboxyl number of 0.15 and containing 0.13 percent water and 75 grams of castor oil having a molecular weight of 830, a hydroxyl number of 161.5, a carboxyl number of 0.0; 74.0 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.51.
Tensile strength, lbs./in.² _____ 22.0.
Compression set, percent _____ 19.9.
Compression load, lbs./in.², 25%; 50% ___ 0.615; 0.827.

*Example 33*

A recipe was prepared comprising 0.5 gram of dibutyltin dilaurate and 0.5 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula (II) supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 50 grams of polypropylene glycol having a molecular weight of 1900, a hydroxyl number of 58.5, a carboxyl number of 0.15 and containing 0.13 percent water; 50 grams of the triol adduct of propylene oxide started with glycerol having a molecular weight of 2300, a hydroxyl number of 72.0 and a carboxyl number of 0.18, and 50 grams of castor oil as characterized in Example 32; 66.0 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.72.
Tensile strength, lbs./in.² _____ 17.0.
Compression set, percent _____ 8.3.
Compression load, lbs./in.², 25%; 50% ___ 0.637; 0.860.

*Example 34*

A recipe was prepared comprising 0.8 gram of dibutyltin dilaurate and 0.8 gram of a copolymer comprising the condensation product of a triethoxy end-blocked branched chain dimethylpolysiloxane having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The aforesaid recipe was added to 150 grams of a linear copolymer of ethylene oxide and propylene oxide containing 10 percent ethylene oxide and 90 percent propylene oxide started with ethylene glycol having a molecular weight of 1900, a hydroxyl number of 58.6 and a carboxyl number of 0.03 and 3.0 grams of 1,2,6-hexanetriol; 60 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.³ _____ 2.32.
Tensile strength, lbs./in.² _____ 12.0.
Compression set, percent _____ 13.0.
Compression load, lbs./in.², 25%; 50% ___ 0.280; 0.363.

*Example 35*

A recipe was prepared comprising 0.8 gram of dibutyltin dilaurate and 0.8 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxy-propylene block containing an average of seventeen (17) oxyethylene units and an average of thirteen (13) oxyproylene units and R'' represents a butyl group).

The aforesaid recipe was added to 150 grams of a linear copolymer of ethylene oxide and propylene oxide containing 25 percent ethylene oxide and 75 percent propylene oxide started with ethylene glycol having a molecular weight of 1600, a hydroxyl number of 68.8 and a carboxyl number of 0.18 and 3.0 grams of 1,2,6-hexanetriol; 63 grams of an 80:20 mixture of 2,4- and 2,6-isomers of tolylene diisocyanate; and 3.75 grams of water.

The above-described mixture was thoroughly mixed and transferred to an open mold as soon as it started foaming. The foamed mixture cured in a matter of minutes and was characterized by the following physical properties:

Density, lbs./ft.$^3$ _____ 2.37.
Tensile strength, lbs./in.$^2$ _____ 18.0.
Compression set, percent _____ 7.8.
Compression load, lbs./in.$^2$, 25%; 50% ____ 0.465; 0.608.

*Example 36*

A recipe was prepared comprising 0.7 gram of dibutyltin dilaurate and 0.7 gram of a copolymer comprising the condensation product of a triethoxy end-blocked branched chain dimethylpolysiloxane having one ethoxy group per terminal silicon atom having a molecular weight of 1524 and a butoxy end-blocked polyoxyalkylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R'' represents a butyl group).

The foresaid recipe was added to 150 grams of polypropylene glycol having a molecular weight of 1900, a hydroxyl number of 58.5, a carboxyl number of 0.15 and containing 0.13 percent water and 3 grams of 1,2,6-hexanetriol; 58 grams of an 80:20 mixture of 2,4- and 2,6-isomers of tolylene diisocyanate; 3.75 grams of water; and 0.1 gram of a dimethylpolysiloxane oil having a viscosity of 100 centistokes.

The above-described mixture was thoroughly mixed and transferred to an open mold as soon as it started foaming. The foamed mixture cured in a matter of minutes and was characterized by the following physical properties:

Density, lbs./cu. ft.$^3$ _____ 3.04
Tensile strength, lbs./in.$^2$ _____ 22.0
Compression load at 25%, p.s.i. _____ 0.573
Compression load at 50%, p.s.i. _____ 0.764

*Example 37*

A recipe was prepared comprising 0.8 gram of dibutyltin diacetate, 0.4 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R'' represents a butyl group), and 0.4 gram of a copolymer of triethoxy end-blocked branched chain dimethylpolysiloxane having a molecular weight of 858 and a butoxy end-blocked polyoxypropylene glycol having a molecular weight of about 800 (as represented by Formula II supra, wherein $p$, $q$ and $r$ have an average value of three (3), the $(C_nH_{2n}O)_z$ unit represents a polyoxypropylene block containing an average of twelve (12) to thirteen (13) oxypropylene units and R'' represents a butyl group).

The above-described recipe was added to 150 grams of polypropylene glycol having a molecular weight of 1844 and a hydroxyl number of 60.8; 3 grams of trimethylol propane; 60 grams of 2,4- and 2,6-isomers of tolylene diisocyanate; and 3.75 grams of water.

As soon as the mixture began to foam, it was transferred to an open mold and cured at 118° C. for 15 minutes. The resulting foam was then removable from the mold and characterized by the following physical properties:

Density, lbs./ft.$^3$ _____ 2.87
Tensile strength, lbs./in.$^2$ _____ 16
Compression load at 25% deflection, p.s.i. ____ 0.414
Compression load at 50% deflection, p.s.i. ____ 0.573
Compression set, percent _____ 13.7

*Example 38*

A recipe was prepared comprising 0.8 gram of dibutyltin dilaurate and 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R'' represents a butyl group).

The above-described recipe was added to 112.5 grams of polypropylene glycol having a molecular weight of 1928 and a hydroxyl number of 58.3; 37.5 grams of a polyether prepared by the reaction of propylene oxide and 1,2,6-hexanetriol and having a hydroxyl number of 72 and a carboxyl number of 0.07; 54.5 grams of an 80:20 mixture of 2,4- and 2,6-isomers of tolylene diisocyanate; and 3.75 grams of water.

As soon as the mixture began to foam, it was transferred to an open mold and after a period of 3 hours at 118° C., the resulting foam could be removed from the mold. The foam was characterized by the following physical properties:

Density, lbs./ft.$^3$ _____ 2.59
Tensile strength, lbs./in.$^2$ _____ 18.0
Compression load at 25% deflection, p.s.i. ____ 0.510
Compression load at 50% deflection, p.s.i. ____ 0.653
Compression set, percent _____ 10.9

*Example 39*

A recipe was prepared comprising 0.9 gram of dibutyltin dilaurate and 0.9 gram of a copolymer of triethoxy end-blocked branched chain dimethlpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R'' represents a butyl group).

The above-described recipe was added to 75 grams of polypropylene glycol having a molecular weight of 1928 and a hydroxyl number of 58.3; 75 grams of a polyether prepared by the reaction of propylene oxide and triethanolamine and having a hydroxyl number of 60.9 and a basic carboxyl number; 54.2 grams of an 80:20 mixture of 2,4- and 2,6-isomers of tolylene diisocyanate; and 3.75 grams of water.

As soon as the mixture began to foam, it was transferred to an open mold and after a period of 15 minutes at 118° C., the resulting foam could be removed from the mold. The foam was characterized by the following physical properties:

| | |
|---|---:|
| Density, lbs./ft.$^3$ | 2.57 |
| Tensile strength, lbs./in.$^2$ | 16 |
| Compression load at 25% deflection, p.s.i. | 0.446 |
| Compression load at 50% deflection, p.s.i. | 0.574 |
| Compression set, percent | 11.5 |

*Example 40*

A recipe was prepared comprising 0.9 gram of dibutyltin dilaurate and 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 100 grams of polypropylene glycol having a molecular weight of 1928 and a hydroxyl number of 58.3; 50 grams of a polyether made by the reaction of propylene oxide and 1,2,6-hexanetriol and having a hydroxyl number of 74.5; 55 grams of an 80:20 mixture of 2,4- and 2,6-isomers of tolylene diisocyanate; and 3.75 grams of water.

As soon as the mixture began to foam, it was transferred to an open mold and after a period of 15 minutes at 118° C., the resulting foam could be removed from the mold. The foam was characterized by the following physical properties:

| | |
|---|---:|
| Density, lbs./ft.$^3$ | 2.65 |
| Tensile strength, lbs./in.$^2$ | 19 |
| Compression load at 25% deflection, p.s.i. | 0.573 |
| Compression load at 50% deflection, p.s.i. | 0.765 |
| Compression set, percent | 13.4 |

*Example 41*

A recipe was prepared comprising 0.9 gram of dibutyltin dilaurate and 0.9 gram of a copolymer of triethoxy end-blocked branched chain dimethylpolysiloxane having a molecular weight of 1524 and butoxy end-blocked polyoxyethylene oxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 150 grams of a polyether prepared by the reaction of propylene oxide and glycerol and having a hydroxyl number of 54.2 and a carboxyl number of 0.09, thoroughly mixed with 54 grams of an 80:20 mixture of 2,4- and 2,6-isomers of tolylene diisocyanate and 3.75 grams of water.

The mixture was stirred and transferred to an open mold as soon as it started to foam. The resulting foam was characterized by the following physical properties:

| | |
|---|---:|
| Density, lbs./ft.$^3$ | 2.92 |
| Tensile strength, lbs./in.$^2$ | 22.4 |
| Compression load at 25% deflection, p.s.i. | 0.796 |
| Compression load at 50% deflection, p.s.i. | 1.05 |
| Compression set, percent | 5.6 |

*Example 42*

A recipe was prepared comprising 0.9 gram of dibutyltin dilaurate and 0.9 gram of a copolymer of triethoxy end-blocked branched chain dimethylpolysiloxane having a molecular weight of 1524 and butoxy end-blocked polyoxyethylene oxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 75 grams of polypropylene glycol having a molecular weight of 2120, a hydroxyl number of 52.49 and a carboxyl number of 0.04; 75 grams of a polyether prepared by the reaction of propylene oxide and glycerol and having a hydroxyl number of 54.2 and a carboxyl number of 0.09; 54 grams of an 80:20 mixture of 2,4- and 2,6-isomers of tolylene diisocyanate; and 3.75 grams of water.

As soon as the mixture began to foam, it was transferred to an open mold and after a period of 15 minutes at 130° C., the resulting foam could be removed from the mold. The foam was characterized by the following physical properties:

| | |
|---|---:|
| Density, lbs./ft.$^3$ | 2.79 |
| Tensile strength, lbs./in.$^2$ | 24.7 |
| Compression load at 25% deflection, p.s.i. | 0.669 |
| Compression load at 50% deflection, p.s.i. | 0.892 |

*Example 43*

A recipe was prepared comprising 0.7 gram of dibutyltin dilaurate and 0.7 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 136.4 grams of polypropylene glycol having a molecular weight of 1844 and a hydroxyl number of 60.8; 13.6 grams of a polyether made by the reaction of propylene oxide and 1,2,6-hexanetriol and having a hydroxyl number of 231.5 and carboxyl number of 0.03; 57.5 grams of an 80:20 mixture of 2,4- and 2,6-isomers of tolylene diisocyanate; and 3.75 grams of water.

As soon as the mixture began to foam, it was transferred to an open mold and after a period of 8 hours, the resulting foam could be removed from the mold. This foam was characterized by the following physical properties:

| | |
|---|---:|
| Density, lbs./ft.$^3$ | 2.76 |
| Tensile strength, lbs./in.$^2$ | 18 |
| Compression load at 25% deflection, p.s.i. | 0.542 |
| Compression load at 50% deflection, p.s.i. | 0.733 |
| Compression set, percent | 16.3 |

*Example 44*

A recipe was prepared comprising 0.5 gram of dibutyltin dilaurate and 0.5 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 30 grams of polypropylene glycol having a molecular weight of 1928 and a hydroxyl number of 58.3; 120 grams of castor oil having a hydroxyl number of 181.0; 72.6 grams of an 80:20 mixture of 2,4- and 2,6-isomers of tolylene diisocyanate; and 3.75 grams of water.

As soon as the mixture began to foam, it was transferred to an open mold and after a period of 2 hours at 110° C., the resulting foam could be removed from the mold. The foam was characterized by the following physical property:

Density, lbs./ft.³ _____ 2.79

*Example 45*

A recipe was prepared comprising 0.9 gram of dibutyltin dilaurate and 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 150 grams of polypropylene glycol having a molecular weight of 1980, a hydroxyl number of 56.7 and a carboxyl number of 0.007; 1.5 grams of urea; 58 grams of an 80:20 mixture of 2,4- and 2,6-isomers of tolylene diisocyanate; and 3.75 grams of water.

As soon as the mixture began to foam, it was transferred to an open mold. The resulting foam was removable after a 15 minute cure at 130° C., indicating a highly efficient curing reaction. It was characterized by the following physical properties:

Density, lbs./ft.³ _____ 2.16
Tensile strength, lbs./in.² _____ 16
Compression load at 25% deflection, p.s.i. _____ 0.334
Compression load at 50% deflection, p.s.i. _____ 0.446
Compression set, percent _____ 14.5

*Example 46*

A recipe was prepared comprising 0.9 gram of dibutyltin dilaurate and 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 150 grams of propylene glycol having a molecular weight of 2100, a hydroxyl number of 53.5 and a carboxyl number of 0.11; 53 grams of a urea-formaldehyde resin prepared by reacting 0.47 mol of formaldehyde with 0.20 mol of urea; 58 grams of an 80:20 mixture of 2,4- and 2,6-isomers of tolylene diisocyanate; and 3.75 grams of water.

As soon as the mixture began to foam, it was transferred to an open mold. This resulting foam could be removed from the mold after a 15 minute cure at 130° C. The foam was characterized by the following physical properties:

Density, lbs./ft.³ _____ 2.73
Tensile strength, lbs./in.² _____ 12.4
Compression load at 25% deflection, p.s.i. _____ 0.478
Compression load at 50% deflection, p.s.i. _____ 0.637
Compression set, percent _____ 9.4

*Example 47*

A recipe was prepared comprising 0.9 gram of dibutyltin dilaurate and 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 150 grams of polypropylene glycol having a molecular weight of 1840, a hydroxyl number of 61.02 and a carboxyl number of 0.026; .75 gram of diethanolamine; 55.5 grams of an 80:20 mixture of 2,4- and 2,6-isomers of tolylene diisocyanate; and 3.75 grams of water.

As soon as the mixture began to foam, it was transferred to an open mold. The resulting foam was removed from the mold after it had been cured for 45 minutes at 130° C., indicating a highly efficient curing reaction. The foam was characterized by the following physical properties:

Density, lbs./ft.³ _____ 2.34
Tensile strength, lbs./in.² _____ 10.2
Compression load at 25% deflection, p.s.i. _____ 0.309
Compression load at 50% deflection, p.s.i. _____ 0.414
Compression set, percent _____ 10.3

*Example 48*

A recipe was prepared comprising 0.9 gram of dibutyltin dilaurate and 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 150 grams of polypropylene glycol having a molecular weight of 2100, a hydroxyl number of 53.5 and a carboxyl number of 0.11; 3 grams of triisopropanolamine; 55 grams of an 80:20 mixture of 2,4- and 2,6-isomers of tolylene diisocyanate; and 3.75 grams of water.

As soon as the mixture began to foam it was transferred to an open mold. The resulting foam could be removed from the mold after a 30 minute cure at 130° C., indicating a highly efficient curing reaction. The foam was characterized by the following physical properties:

Density, lbs./ft.³ _____ 2.47
Tensile strength, lbs./in.² _____ 14.3
Compression load at 25% deflection, p.s.i. _____ 0.328
Compression load at 50% deflection, p.s.i. _____ 0.446
Compression set, percent _____ 17.0

*Example 49*

A recipe was prepared comprising 0.9 gram of dibutyltin dilaurate and 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to 150 grams of polypropylene glycol having a molecular weight of 2100, a hydroxyl number of 53.5 and a carboxyl number of 0.11; 1 gram of diisopropanolamine; 52.6 grams of an 80:20 mixture of 2,4- and 2,6-isomers of tolylene diisocyanate; and 3.75 grams of water.

As soon as the mixture began to foam, it was transferred to an open mold and cured at 130° C. for 30 minutes. The resulting foam was then removable from the mold, indicating a highly efficient curing reaction.

The foam was characterized by the following physical properties:

| | |
|---|---|
| Density, lbs./ft.$^3$ | 2.76 |
| Tensile strength, lbs./in.$^2$ | 11.0 |
| Compression load at 25% deflection, p.s.i. | 0.389 |
| Compression load at 50% deflection, p.s.i. | 0.542 |
| Compression set, percent | 11.7 |

*Example 50*

A recipe was prepared comprising 0.67 gram of dibutyltin dilaurate and 1.3 grams of a copolymer of triethoxy end-blocked branched chain dimethylpolysiloxane having a molecular weight of 858 and a methoxy end-blocked polyoxyethylene glycol having a molecular weight of 750 (as represented by Formula II supra, wherein $p$, $q$ and $r$ each have a value of three (3), the $(C_nH_{2n}O)_z$ unit is a polyoxyethylene block containing sixteen (16) oxyethylene units and $R''$ represents a methyl group).

The above-described recipe was added to a mixture of (1) 67.9 grams of a polyether prepared by the reaction of propylene oxide and a mixture of 1,1,3-tris(hydroxyphenyl) propanes having a phenolic hydroxyl number of 513.5 until a hydroxyl number of 284 was obtained and (2) 32.1 grams of a polyether prepared by the reaction of propylene oxide and glycerol and having a hydroxyl number of 652, said mixture having a hydroxyl number of 402 and a negative carboxyl number thoroughly mixed with 75.4 grams of an 80:20 mixture of 2,4- and 2,6-isomers of tolylene diisocyanate containing 0.1 percent dissolved ethyl cellulose and 1.3 grams of water.

The mixture was stirred and transferred to an open mold as soon as the reactants started to get warm. The foam was removable from the mold after approximately 3 minutes, indicating a highly efficient curing reaction. The foam was characterized by the following physical properties:

| | |
|---|---|
| Density, lbs./ft.$^3$ | 3.9 |
| Closed cells, percent | 90 |

*Example 51*

A recipe was prepared comprising 0.34 gram of dibutyltin dilaurate and 0.65 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and $R''$ represents a butyl group).

The above-described recipe was added to 50 grams of a polyether prepared by the reaction of propylene oxide and pentaerythritol and having a hydroxyl number of 419.5 and a negative carboxyl number thoroughly mixed with 45.6 grams of an 80:20 mixture of 2,4- and 2,6-isomers of tolylene diisocyanate containing 0.1 percent of dissolved ethyl cellulose and 1.3 grams of water.

The mixture was stirred and transferred to an open mold as soon as it started to get warm. The resulting foam was characterized by the following physical properties:

| | |
|---|---|
| Density, lbs./ft.$^3$ | 2.3 |
| 70% strength retention temp., °C. | 81 |
| 10% compression load, p.s.i. | 27 |

*Example 52*

A recipe was prepared comprising 0.67 gram of dibutyltin dilaurate and 1.3 grams of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and $R''$ represents a butyl group).

The above-described recipe was added to a mixture of (1) 70 grams of a polyether prepared by the reaction of propylene oxide and a mixture of 1,1,3-tris(hydroxyphenyl) propanes having a phenolic hydroxyl number of about 527 until a hydroxyl number of 262 was obtained and (2) 30.0 grams of a polyether prepared by the reaction of propylene oxide and glycerol and having a hydroxyl number of 650.5, said mixture having a hydroxyl number of 378.6 and a negative carboxyl number thoroughly mixed with 72.6 grams of an 80:20 mixture of 2,4- and 2,6-isomers of tolylene diisocyanate containing 0.1 percent of dissolved ethyl cellulose and 1.3 grams of water.

The mixture was stirred and transferred to an open mold as soon as it started to get warm. The foam was removable from the mold after approximately 3 minutes, indicating a highly efficient curing reaction. The foam was characterized by the following physical properties:

| | |
|---|---|
| Density, lbs./ft.$^3$ | 3.1 |
| 70% strength retention temp., °C. | 93 |
| 10% compression load, p.s.i. | 51 |

*Example 53*

A recipe was prepared comprising 0.67 gram of dibutyltin dilaurate and 1.3 grams of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ are six (6), the $(C_nH_{2n}O)_z$ represents a mixed polyoxyethyleneoxypropylene block containing seventeen (17) oxyethylene units and thirteen (13) oxypropylene units and $R''$ represents a butyl group).

The above-described recipe was added to a mixture of (1) 55 grams of a polyether prepared by the reaction of propylene oxide and a mixture of 1,1,3-tris(hydroxyxylyl) propanes having a hydroxyl number of 395.6 until a hydroxyl number of 222.8 was obtained and (2) 45 grams of a polyether prepared by the reaction of propylene oxide and trimethylolethane and having a hydroxyl number of 576.4, said mixture having a hydroxyl number of 381.9 and a negative carboxyl number thoroughly mixed with 72.2 grams of an 80:20 mixture of 2,4- and 2,6-isomers of tolylene diisocyanate containing 0.1 percent of dissolved ethyl cellulose and 1.3 grams of water.

The mixture was stirred and transferred to an open mold as soon as it started to get warm. The foam was removable from the mold in 3 minutes, indicating a highly efficient curing reaction. The foam was characterized by the following physical properties:

| | |
|---|---|
| Density, lbs./ft.$^3$ | 3.3 |
| 70% strength retention temp., °C. | 88 |
| 10% compression load, p.s.i. | 50 |
| Closed cells, percent | 86 |

*Example 54*

A recipe was prepared comprising 0.67 grams of dibutyltin dilaurate and 1.3 grams of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and $R''$ represents a butyl group).

The above-described recipe was added to a mixture of (1) 65 grams of a polyether prepared by the reaction of propylene oxide and a mixture of 1,1,3-tris(hydroxyxylyl) propanes having a hydroxyl number of 395.6 until a hydroxyl number of 222.8 was obtained and (2) 35 grams of a polyether prepared by the reaction of propylene oxide with glycerol and having a hydroxyl number of 652.2, said mixture having a hydroxyl number of 373.1 and a negative carboxyl number thoroughly mixed with 71.0 grams of an 80:20 mixture of 2,4- and 2,6-isomers of tolylene diisocyanate containing 0.1 percent of dissolved ethyl cellulose and 1.3 grams of water.

The mixture was stirred and transferred to an open mold as soon as it started to get warm. The foam was removable from the mold in 3 minutes, indicating a highly efficient curing reaction. The foam was characterized by the following physical properties:

| | |
|---|---|
| Density, lbs./ft.$^3$ | 3.7 |
| 70% strength retention temp., ° C. | 89 |
| 10% compression load, p.s.i. | 59 |
| Closed cells, percent | 92 |

*Example 55*

A recipe was prepared comprising 0.67 gram of dibutyltin dilaurate and 1.3 grams of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to a mixture of (1) 60 grams of a polyether prepared by the reaction of propylene oxide with a two-step phenol-formaldehyde resin containing 2, 2′ linkage and an average of 4 to 5 phenolic rings per molecule (prepared from 100 parts by weight of phenol and 56.5 parts by weight of formaldehyde in accordance with the procedure set forth in Example 1 of U.S. 2,475,587 and having a viscosity of 14 centistokes as a 35.0 weight percent in ethanol) until a hydroxyl number of 220.2 and (2) 40 grams of a polyether prepared by the reaction of propylene oxide with glycerol until a hydroxyl number of 650.5 was obtained, said mixture having a hydroxyl number of 392.3 and thoroughly mixed with 74.0 grams of an 80:20 mixture of 2,4- and 2,6-isomers of tolylene diisocyanate containing 0.1 percent of dissolved ethyl cellulose and 1.3 grams of water.

The mixture was stirred and transferred to an open mold as soon as it started to get warm. The foam was removable from the mold in 3 minutes, indicating a highly efficient curing reaction. The foam was characterized by the following physical properties:

| | |
|---|---|
| Density, lbs./ft.$^3$ | 3.4 |
| 70% strength retention temp., ° C. | 89 |
| 10% compression load, p.s.i. | 53 |

*Example 56*

A recipe was prepared comprising 0.67 gram of dibutyltin dilaurate and 1.3 grams of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The above-described recipe was added to a mixture of (1) 70 grams of a polyether prepared by the reaction of propylene oxide with a two-step phenol-formaldehyde resin containing an average of 6 phenolic rings per molecule prepared from 100 parts by weight of phenol and 72 parts by weight of formaldehyde in the presence of 0.56 part by weight of oxalic acid as a catalyst in accordance with the procedure set forth in Example 2 of U.S. 2,475,587 and having a plate flow of 30 mm. at 125° C. until a hydroxyl number of 265.7 was obtained and (2) 30 grams of a polyether prepared by the reaction of propylene oxide with glycerol until a hydroxyl number of 650.5 was obtained, said mixture having a hydroxyl number of 381.1 and a negative carboxyl number and thoroughly mixed with 67.3 grams of an 80:20 mixture of 2,4- and 2,6-isomers of tolylene diisocyanate containing 0.1 percent of dissolved ethyl cellulose and 1.3 grams of water.

The mixture was stirred and transferred to an open mold as soon as it started to get warm. The foam was removable from the mold in 3 minutes, indicating a highly efficient curing reaction. The foam was characterized by the following physical properties:

| | |
|---|---|
| Density, lbs./ft.$^3$ | 3.4 |
| 70% strength retention temp., ° C. | 86 |
| 10% compression load, p.s.i. | 58 |

In the preceding examples, the density was determined by weighing a cylindrical sample two inches in diameter and one inch thick and thereupon calculating the density in pounds per cubic foot. To evaluate compression, a cylindrical sample two inches in diameter and one inch thick was placed on the anvil (six inch diameter) of an Instron equipped for compression tests, the cross head moved a plate of three inches in diameter toward the anvil at a rate of two inches per minute, and the stress load on the anvil was plotted against the deflection of the sample. The stress load is given in p.s.i. for 10%, 25% and 50% deflections. The compression set is measured in accordance with the procedure outlined in ASTM D395–53T, Method B. Plate flow is determined by taking two grams of resin and forming a pellet 6 mm. thick and 12 mm. in diameter. This is placed on a 6″ x 6″ glass plate and placed in an oven at 125° C. After 3 minutes, the plate is tilted at an angle of 65° from the horizontal and after 20 minutes more is removed from the oven and the length of the flow path is measured.

Tensile strength and elongation were determined in accordance with the procedure set forth in Rubber Age, Volume 79, Number 5, pages 803–810 (1956). Percentage closed cells or closed cell content was determined by the method of W. J. Remington and R. Pariser presented before the Division of Rubber Chemistry, ACS, in New York, September 12, 1957, and published in Rubber World, Volume 138, Number 2, pages 261–264 (1958). Strength retention in degree C. at 70 percent was determined by placing specimens of foams ⅛″ x ½″ x 3″ in the jaws of Instron machine which extend into a temperature cabinet. After the specimen is mounted in the jaws the cabinet is sealed and a constant temperature is maintained therein for three minutes prior to application of load. Load is applied in tension and the specimen is extended by an amount equivalent to one percent of the original jaw separation. The load is immediately relaxed and, since the limit of elasticity has not been exceeded, the specimen returns essentially to its original length. The rate of head movement is 0.2 in./min. Load and head movement are recorded automatically on a continuous strip chart. This procedure is followed at various temperature increments, starting at about room temperature and continuing up until the load necessary to extend the specimen one percent has fallen below 70 percent of that required at about room temperature. The loads at one percent extension are then plotted against the temperatures and connected by a curve. The temperature at which the load is 70 percent of the load at about room temperature is then recorded as the strength retention temperature in degree C. (70%).

What is claimed is:

1. Curing compositions comprising an organo-tin compound having a direct carbon-to-tin valence bond and at least one other bond from said tin being connected to a member of the group consisting of halogen, oxygen, sulfur, nitrogen and phosphorus and a polysiloxane-oxyalkylene copolymer containing from about 10 to about 80 percent by weight of siloxane polymer and from 90 to 20 percent by weight of alkylene oxide polymer.

2. Curing compositions comprising dibutyltin dilaurate and a polysiloxane-oxyalkylene copolymer containing from about 10 to about 80 percent by weight of siloxane polymer and from 90 to 20 percent by weight of alkylene oxide polymer and characterized by the formula:

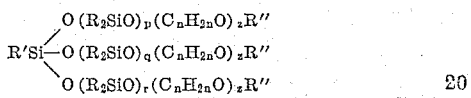

wherein R' represents an ethyl group, R represents a methyl group, R'' represents a butyl group, $p$, $q$ and $r$ each have an average value of six and the $(C_nH_{2n}O)_z$ unit represents a mixed polyoxyethyleneoxypropylene block containing an average of seventeen oxyethylene units and an average of thirteen oxypropylene units wherein $z$ is an integer having an average value of thirty and $n$ is an integer in the range of 2 to 4.

3. Curing compositions comprising dibutyltin diacetate and a polysiloxane-oxyalkylene copolymer containing from about 10 to about 80 percent by weight of siloxane polymer and from 90 to 20 percent by weight of alkylene oxide polymer and characterized by the formula:

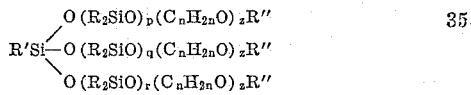

wherein R' represents an ethyl group, R represents a methyl group, R'' represents a butyl group, $p$, $q$ and $r$ each have an average value of six and the $(C_nH_{2n}O)_z$ unit represents a mixed polyoxyethyleneoxypropylene block containing an average of seventeen oxyethylene units and an average of thirteen oxypropylene units wherein $z$ is an integer having an average value of thirty and $n$ is an integer in the range of 2 to 4.

4. Curing compositions comprising dibutyltin dilaurate and a polysiloxane-oxyalkylene copolymer containing from about 10 to about 80 percent by weight of siloxane polymer and from 90 to 20 percent by weight of alkylene oxide polymer and characterized by the formula:

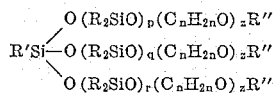

wherein R' represents an ethyl group, R and R'' represent methyl groups, $p$, $q$ and $r$ each have an average value of three and the $(C_nH_{2n}O)_z$ unit represents a polyoxyethylene block containing an average of sixteen oxyethylene units wherein $z$ is equal to 16 and $n$ is equal to 2.

5. Curing compositions comprising dibutyltin dilaurate and a polysiloxane-oxyalkylene copolymer containing from about 10 to about 80 percent by weight of siloxane polymer and from 90 to 20 percent by weight of alkylene oxide polymer and characterized by the formula:

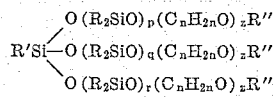

wherein R' represents an ethyl group, R represents a methyl group, R'' represents a butyl group, $p$, $q$ and $r$ each have an average value of three and the $(C_nH_{2n}O)_z$ unit represents a polyoxyethylene block containing an average of 12 to 13 oxypropylene units wherein $z$ is an integer having an average value of 12 to 13 and $n$ is equal to 3.

6. Curing compositions comprising dibutyltin diacetate and a polysiloxane-oxyalkylene copolymer containing from about 10 to about 80 percent by weight of siloxane polymer and from 90 to 20 percent by weight of alkylene oxide polymer and characterized by the formula:

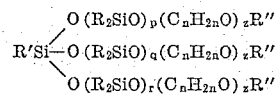

wherein R' represents an ethyl group, R and R'' represent methyl groups, $p$, $q$ and $r$ each have an average value of three and the $(C_nH_{2n}O)_z$ unit represents a polyoxyethylene block containing an average of sixteen oxyethylene units wherein $z$ is equal to 16 and $n$ is equal to 2.

No references cited.

LEON J. BERCOVITZ, *Primary Examiner.*

DANIEL ARNOLD, *Examiner.*